United States Patent [19]

Barker et al.

[11] 4,454,089
[45] Jun. 12, 1984

[54] PROCESS FOR THE PRODUCTION OF PELLETS OF A HEAT FUSIBLE THERMOSETTABLE MOLDING COMPOSITION

[75] Inventors: Henry P. Barker, Lenox; Lewis J. Rummings, Pittsfield, both of Mass.

[73] Assignee: Plastics Engineering Company, Sheboygan, Wis.

[21] Appl. No.: 370,465

[22] Filed: Apr. 21, 1982

Related U.S. Application Data

[63] Continuation of Ser. No. 922,203, Jul. 7, 1978, abandoned.

[51] Int. Cl.³ .................................................. B01J 2/22
[52] U.S. Cl. ...................................... 264/140; 264/167
[58] Field of Search ................................ 264/140, 167

[56] References Cited

U.S. PATENT DOCUMENTS 3,091,012  5/1963  Bell ........................................... 25/2

FOREIGN PATENT DOCUMENTS 2226691 12/1972 Fed. Rep. of Germany .
655185  7/1951 United Kingdom .
875140  8/1961 United Kingdom .

Primary Examiner—James R. Hall
Attorney, Agent, or Firm—Walter J. Monacelli

[57] ABSTRACT

A process for producing pellets of a heat fusible thermosettable molding composition from a substantially hot melt material of a heat fusible thermosettable molding composition which comprises supplying said melt material between a calendering roll peripherally formed with recesses and another rigid surface which forms said molten material into pellets. Also, the instant invention is directed to the apparatus by which these pellets are produced.

8 Claims, 6 Drawing Figures

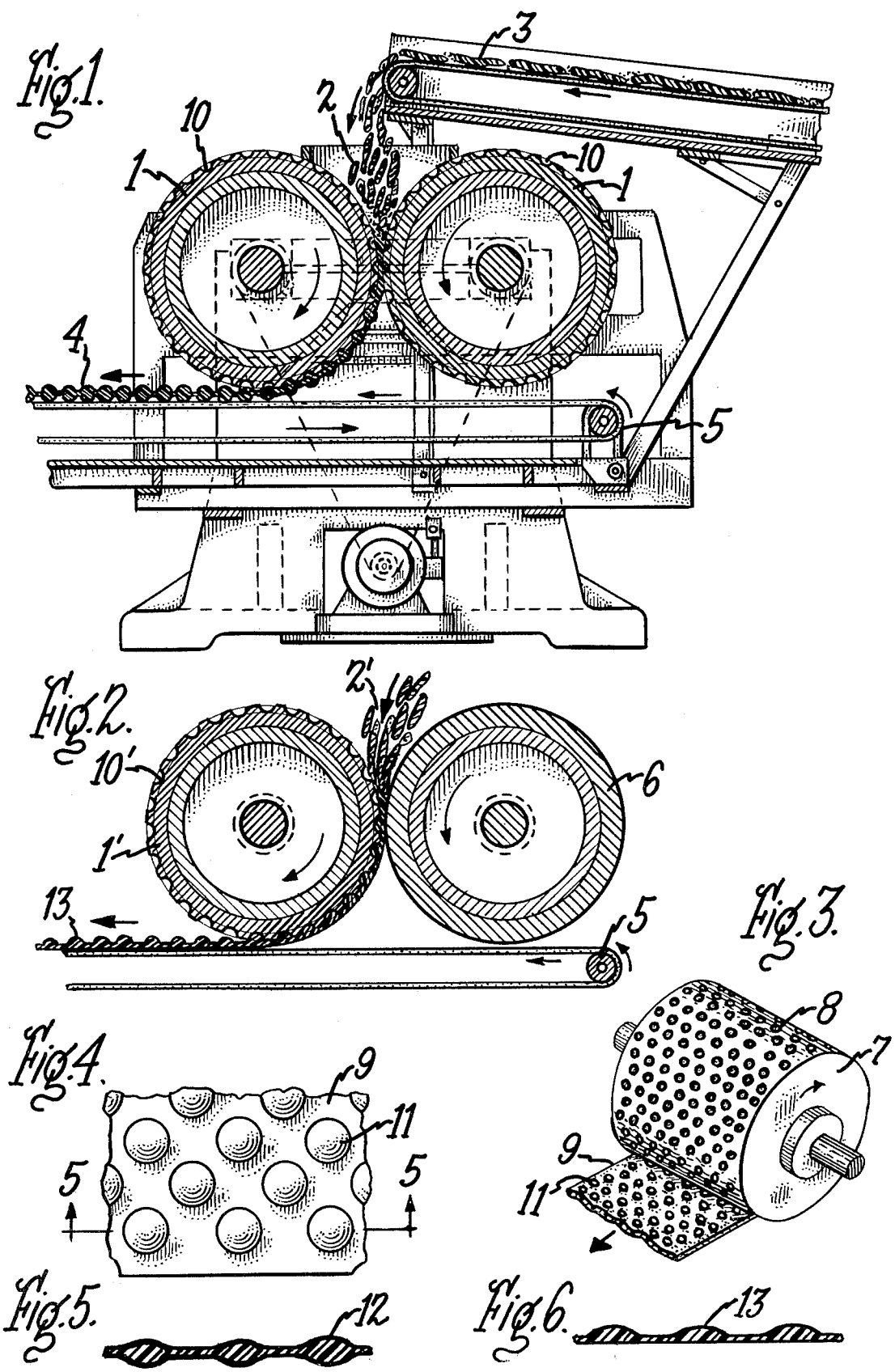

PROCESS FOR THE PRODUCTION OF PELLETS OF A HEAT FUSIBLE THERMOSETTABLE MOLDING COMPOSITION

This is a continuation of application Ser. No. 922,203 filed July 7, 1978 now abandoned.

This invention is directed to a process for producing pellets of a heat fusible thermosettable molding composition from a substantially hot melt material of a heat fusible thermosettable molding composition which comprises supplying said melt material between a calendering roll peripherally formed with recesses and another rigid surface which forms said molten material into pellets having one dimension of at least 1/16 inch. Also, the instant invention is directed to the apparatus by which these pellets are produced.

BACKGROUND OF THE INVENTION

Phenolic molding compositions have been available for many years and generally consist of phenol-formaldehyde resin blended with various fillers. The molding compositions are prepared by blending a one-stage or two-stage phenol-formaldehyde resin with fillers and then working the material between differential hot rolls in order to soften the resin and obtain a more uniform blend of the constitutents. The composition is then cooled, crushed, and screened for some degree of uniformity of particle size. Unfortunately, such molding compositions are dusty, and lack uniform size.

The dust component remaining in the processed material is also very undesirable. Such dust component tends to cause soiling of the various machines and devices that are used; it is unpleasant to service personnel and may even constitute a danger to health. Moreover, there is a danger of dust explosions. Additionally, the time of contact with the hot rolls is critical, an the process is costly because of the many steps to the final molding composition.

It is further known from the manufacture of thermoplastics to produce granules of uniform size in continuous operation with the processing of the material in a screw extruder. The synthetic plastic after having been melted and homogenized in a screw extruder is pressed out through a perforated plate and then immediately granulated by means of a suitable cutting device cutting the strands of material as they emerge from the perforated plate.

It has also been attempted to granulate thermosetting plastic material immediately following the processing of material in a screw extruder in a manner similar to that used in the processing of thermoplastics. In view of the present great economic importance of synthetic thermosetting plastic materials, it is readily understandable that the industry is very much interested in the development of a process for granulating synthetic thermosetting plastic material in the same continuous, convenient and economic manner in which synthetic thermoplastics can be granulated.

However, the methods heretofore suggested for the purpose are not a truly satisfactory solution of the problem. There are several difficulties inherent in the properties of thermosetting material. The flow resistance offered by the perforated discharge plate is too high for the highly viscous thermosetting plastic material. As a result, there is a heavy load built up at the extruder and additional heating of the material. Such additional heating of the material causes a progressive and unacceptable hardening of the plastic material.

Thermosetting plastic material which is subjected to a too strong thermal loading results in an end product unsuitable for further processing. Moreover, the flow of the material within the extruder becomes irregular; there is a tendancy of forming regions of stagnation within the extruder casings and the orifices or perforations in the perforated discharge plate tend to become clogged. It becomes necessary to stop the extruder after a comparatively short running time. This condition may be corrected, however. Expensive equipement is necessary to correct this problem.

DESCRIPTION OF THE INVENTION

It has now been discovered that the process of the instant invention results in a short residence time; that is, the time the material is being formed as compared to an extrusion process where temperature control is difficult which causes the material to cure and harden.

Also, by converting a phenol-aldehyde molding composition by this process into a solid dry particular pellet form having a dimension of at least 1/32 inch, a composition is obtainable which can be injection molded with ease, has a high density and thus compacts better for ease of loading and packing, and also presents a better product. Moreover, the process of this invention produces a solid dry product which is essentially completely dust free and is very suitable for injection molding in apparatus used for the injection molding of thermoplastics.

This invention is directed to a process for producing pellets of a heat fusible thermosettable molding composition from a substantially hot melt material of a heat fusible thermosettable molding composition which comprises supplying said melt material between a calendering roll peripherally formed with recesses and another rigid surface which forms said molten material into pellets having a dimension of at least 1/16 inch.

The heat fusible thermosettable molding composition which is used is preferably a phenol-aldehyde resin and can be any phenol-aldehyde resin which is prepared by reacting from less than one mole to more than one mole of an aldehyde per mole of phenol under certain conditions to provide a resin. If less than one mole of an aldehyde is used, the resin so produced is commonly called a novolac. The novolac resin is generally the type that can be finely ground and requires blending thereof with an external crosslinking agent such as hexamethylenetetramine in order to provide a thermosettable resin which can be advanced to an infusible state upon exposure to elevated temperatures. While any external crosslinking agent can be employed herein, the perferred external crosslinking agent is hexamethylenetetramine. Generally, the preferred range of aldehyde employed herein to prepare the novolac is 0.5–0.9 moles thereof per mole of phenol and preferably 0.6–0.8 moles thereof. While many aldehydes can be employed herein such as formaldehyde, paraformaldehyde, furfuraldehyde, etc., the preferred aldehyde to be employed herein is formaldehyde.

When employing more than one mole of aldehyde per mole of phenol, a one-stage resin is produced which can be advanced to an infusible state by the mere application of elevated temperatures. The one-stage resin which can be employed herein is one prepared by reacting more than one mole of an aldehyde per mole of phenol and preferably 1.1–3.0 moles thereof. Again, the preferred aldehyde is formaldehyde.

In addition, it has also been observed that when using a phenolformaldehyde novolac, favorable molding characteristics are obtained when the novolac has ortho-ortho content of less than 70 weight percent of the total novolac composition. Optimum results are obtained when the ortho-ortho content is around 50 weight percent, the balance of the novolac consists of ortho-para and para-para linkages.

By these various types of linkage, it is meant the methylene bridging between the phenol nuclei and can be represented by the following formulas

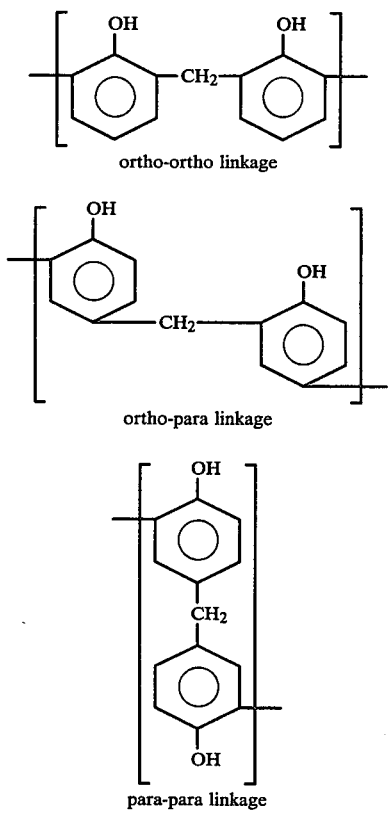

A. ortho-ortho linkage

B. ortho-para linkage para-para linkage

It should be noted that the phenolic resin compositions can, and generally do, have present additive compounds which are normally used in such compositions in addition to the composition of this invention. These fibers include such materials as asbestos fibers, wood flour, cotton flock, cellulose flock, cotton flock, calcium carbonate, glass fibers, etc., and any combination of these or other known fillers employed in the phenolic molding composition art. In addition, there are also employed such additives as lime, stearic acid, magnesium hydroxide, charcoal, etc.

These compositions are prepared by methods well known to those skilled in the art.

The substantially hot melt material of a heat fusible thermosettable molding composition means that the thermosettable molding composition is supplied to the apparatus after compounding and is generally at a temperature of from 150° to 250° F. Prior to supplying it to the pelletizing apparatus, materials may be added to this hot melt material, such as fillers, etc.

The pellets produced by the instant process may be of varying sizes and shapes depending upon the size and shape of the recesses in a calendering roll. The term "pellet" herein means a solid of any shape including spherical, cylinderical, ellipsoidal, etc. and any variations of these shapes. However, the pellet must have one dimension of at least 1/16 inch.

The rigid surface of the instant invention may include a pressure plate against which the calendering roll presses to form the pellets. Also, the rigid surface may include any other type of roll or combination of rolls of varying sizes either recessed or unrecessed. If the rigid surface is another recessed roll, preferably the recesses of both rolls register with each other during operation.

The calendering roll of the instant invention may be any type of roll which exerts a pressure against the other rigid surface. This roll contains closely spaced recesses on the peripheral surface. These closely spaced recesses may be of varying sizes and/or shapes.

The calendering roll may be maintained at a temperature of from about 60° F. to about 150° C. If more than one roll is used, the rolls may be maintained at varying temperatures.

The apparatus for producing pellets of a heat fusible thermosettable molding composition having one dimension of at least 1/32 inch comprises a calendering roll peripherially formed with closely spaced recesses evenly distributed therein, means for feeding the material to said roll, a rigid surface to register with said calendering roll, and means for removing the material from said roll.

In the accompanying drawings, several embodiments of an apparatus for carrying out the process of the invention as well as a form of the pellets of this invention are shown by way of illustration and not by way of limitation.

FIG. 1 is a view of a calendering roll apparatus, in central verticle section, for the production of pellets.

FIG. 2 is an alterate view of the calender roll apparatus wherein only one of the rolls is recessed.

FIG. 3 is a side view of a recessed calender roll.

FIG. 4 is a view of a sheet of pellets obtained by the process of the instant invention.

FIG. 5 is a view of a sheet of particularly shaped pellets.

FIG. 6 is a view of another sheet of particularly shaped pellets.

Referrring to FIG. 1, this figure shows material 2 being conveyed by conveyor 3 between two calendering rolls, 1, each with recesses 10, where the material is pelletized by the rotation of rolls 1 and formed into a sheet of pellets 4 and removed by conveyor 5. FIG. 2 shows material 2' being fed between a single recessed calendering roll 1' and an unrecessed roll 6. These rolls pelletize the material by counter rotating resulting in a sheet of pellets 13. FIG. 3 shows calendering roll 7 with recesses 8 with a sheet of pellets 9 containing pellets 11. FIG. 4 is a view of a sheet of pellets 9 containing pellets 11. FIG. 5 is a view of a sheet of pellets containing particularly shaped pellets 12. FIG. 6 is a view of a sheet of pellets containing particularly shaped pellets 13.

DESCRIPTION OF THE PREFERRED EMBODIMENT

The following examples are set forth to illustrate more clearly the principle and practice of this invention to those skilled in the art and unless otherwise specified, where parts or percentages are mentioned, they are parts or percentages by weight.

EXAMPLE I

A phenol-formaldehyde resin is prepared by reacting about 0.7 moles of formaldehyde per mole of phenol in the presence of a catalyst, which may be subsequently neutralized, to form a novolac.

The novolac is ground to a fine particle size with about 15 percent of hexamethylenetetramine based on the weight of novolac. The resin mixture is then blended with about 35 weight percent of filler and about 15 percent weight of wood flour to form a 50/50 mixture. The blend is then continuously compounded in a screw extruder at about 220° F. which is sufficient to melt the resin. The molten mixture is advanced through the screw and extruded through a die orifice of about ⅛ inch in diameter. The extrudate is then comminuted into pellets of about ⅛ inch long. After two hours of operation, the machine had to be stopped since the material had hardened in the die orifice.

EXAMPLE II

Example I is repeated and after 24 hours of operation, the machine had to be stopped since the material had hardened in the die orifice.

EXAMPLE III

Example I is repeated and after 12 hours of operation, the machine had to be stopped since the material had hardened in the die orifice.

EXAMPLE IV

Example I is repeated except that the 50/50 blend of resin and fillers is not compounded in a screw extruder but is compounded on heated differential rolls of about 220° F. The compound material is cooled and then is ground in a rotary cutter. The ground material is screened, and the portion between 10 and 70 mesh collected as product. The largest particle size is less than ⅛ in diameter.

The material produced is dusty and uneven in particle size.

EXAMPLE V

Example I is repeated except that the molten material is not extruded through a die orifice but allowed to fall directly from the extruder in the form of hot melt "chips" at 150°–250° F. between two calendering rolls which are peripherally recessed and maintained at a temperature of 150° F. and 60° F, respectively. The pellets come from out of the calendering rolls in the form of a sheet connected by a thin flashing approximately 0.010 inches. The pellets have a diameter of ⅛ inch. All the pellets produced are of this diameter. Also, the apparatus can be operated almost indefinitely.

As can be seen from the Examples, the method of the instant invention as drawn in Example V can be operated almost indefinitely, while using the method of Examples I to III erratic operation is seen. Also, Example V shows that the instant process produces a uniform pellet whereas the conventional method of Example IV gives a product of non-uniform size.

Obviously, other modifications and variations of the present invention are possible in the light of the above teachings. It is, therefore, to be understood that changes may be made in the particular embodiments described which are within the full intended scope of the invention as defined by the appended claims.

What is claimed is:

1. A process for producing pellets of a heat-fusible thermosetting molding composition, said process consisting essentially of the following steps:
   (a) supplying said composition in a molten condition at a temperature of from about 150° F. to about 250° F. between a rotating calendering roll having recesses and another engaging roll which forms said melt into a sheet of raised pellets, which pellets have one dimension of at least 1/16th inch,
   (b) removing said sheet of pellets from said rolls, and
   (c) separating said pellets from said sheet.

2. The process of claim 1 wherein said composition is a phenol-aldehyde resin.

3. The process of claim 2 wherein sid phenolaldehyde resin is a phenol-formaldehyde novolac having an ortho-ortho content of less than 70 weight percent of the total novolac resin.

4. The process of claim 3 wherein said novolac resin is blended with an external crosslinking agent.

5. The process of claim 4 wherein said crosslinking agent is hexamethylenetetramine.

6. The process of claim 2 wherein said phenolaldehyde resin is admixed with an additive.

7. The process of claim 1 wherein said engaging roll is a calendering roll having recesses therein.

8. The process of claim 1 wherein said engaging roll is a duplicate calendering roll peripherally formed with closely spaced recesses therein which register with the recesses in said rotating calendering roll.

* * * * *

UNITED STATES PATENT AND TRADEMARK OFFICE
CERTIFICATE OF CORRECTION

PATENT NO. : 4,454,089

DATED : June 12, 1984

INVENTOR(S) : Henry P. Barker and Lewis J. Rummings

It is certified that error appears in the above-identified patent and that said Letters Patent is hereby corrected as shown below:

Col. 1, line 38, correct "an" to read "and".

Col. 2, line 12, correct "equipement" to read "equipment".

Col. 5, line 13, after "percent" insert "by".

Col. 6, line 34, correct "sid" to read "said".

Signed and Sealed this

Twenty-third Day of October 1984

[SEAL]

Attest:

Attesting Officer

GERALD J. MOSSINGHOFF

Commissioner of Patents and Trademarks